US005518443A

United States Patent [19]

Fisher

[11] Patent Number: 5,518,443

[45] Date of Patent: May 21, 1996

[54] SUPERABRASIVE TOOL

[75] Inventor: Kawika S. Fisher, Buford, Ga.

[73] Assignee: Norton Company, Worcester, Mass.

[21] Appl. No.: 242,523

[22] Filed: May 13, 1994

[51] Int. Cl.[6] .......... B23F 21/03

[52] U.S. Cl. .......... 451/540; 451/542; 125/15

[58] Field of Search .......... 125/15, 13.01, 125/21; 451/542, 544

[56] References Cited

U.S. PATENT DOCUMENTS

| | | | |
|---|---|---|---|
| 3,028,710 | 4/1962 | Pratt | 125/15 |
| 3,049,843 | 4/1962 | Christensen | 125/15 |
| 3,110,579 | 11/1963 | Benson et al. | 125/15 |
| 3,128,755 | 4/1964 | Benson | 125/15 |
| 3,513,821 | 2/1968 | Bouvier | 125/15 |
| 4,860,722 | 8/1989 | Ueglio | 125/15 |
| 4,883,500 | 11/1989 | Deskins et al. | 51/298 |

FOREIGN PATENT DOCUMENTS

| | | | |
|---|---|---|---|
| 57-033969 | 2/1982 | Japan | B24D 5/12 |
| 57-184674 | 11/1982 | Japan | B24D 5/12 |
| 0293770 | 12/1986 | Japan | 125/15 |
| 0329025 | 9/1972 | U.S.S.R. | 125/15 |
| 9201542 | 2/1992 | WIPO | B28D 1/12 |

*Primary Examiner*—Bruce M. Kisliuk
*Assistant Examiner*—Derris H. Banks
*Attorney, Agent, or Firm*—Brain M. Kolkowski; Mary E. Porter

[57] ABSTRACT

The present invention is related to an abrasive tool comprising a core and abrasive segments attached to said core wherein said abrasive segments comprise a bond material and superabrasive grains and wherein said segments comprise at least two circumferentially spaced regions and wherein said superabrasive grains are alternately dispersed in said regions in high and low concentrations of superabrasive grains. The present invention is further related to an abrasive tool comprising a core and abrasive segments attached to said core wherein said abrasive segments comprise a bond material and superabrasive grains, wherein said abrasive segments comprise at least two circumferentially spaced regions and wherein said superabrasive grains are alternately dispersed in every other region.

13 Claims, 2 Drawing Sheets

SUPERABRASIVE TOOL

BACKGROUND OF THE INVENTION

1. Field of the Invention

This invention relates to superabrasive tools such as wheel segments which comprise a superabrasive grain such as diamond, cubic boron nitride (CBN) or boron suboxide (BxO).

2. Technology Review

Conventionally, the cutting of hard materials such as granite, marble, filled concrete, asphalt and the like is achieved with the use of superabrasive saw blades. These segmented saw blades are well known. The blade comprises a circular steel disc having a plurality of spaced segments. The segments of the tools contain superabrasive grain dispersed randomly in a metal matrix. The performance of these segmented tools is measured by examining the speed of cut and tool life. Speed of cut is a measurement of how fast a given tool cuts a particular type of material while tool life is the cutting life of the blade.

Unfortunately, the performance of these segmented abrasive cutting tools requires a tradeoff. The tradeoff is that generally it is found that the quicker cutting blades have a shorter life while the longer life blades cut quite slowly. With conventional blades this results because the matrix which holds the abrasive grain has a large impact on speed of cut and blade life.

With metal bonds for example, a hard matrix such as iron bond holds the abrasive grains better, improving the life of the blade. This increases the life of each individual abrasive grain by allowing them to dull and thereby reduce the speed of cut. Conversely, for example a softer matrix such as a bronze bond allows the abrasive grains to be pulled out of the matrix more easily thereby improving the speed of cut. This decreases the life of each abrasive grain by allowing for exposure of new sharp abrasive grains more readily at the cutting surface.

The object of the present invention is therefore to produce a segmented superabrasive tool wherein both the speed of cut and tool life are improved. A further object of this invention is to produce an superabrasive segment wherein the superabrasive grains are preferentially concentrated to achieve these results.

SUMMARY OF THE INVENTION

The present invention is related to an abrasive tool comprising a core and abrasive segments attached to said core wherein said abrasive segments comprise a bond material and superabrasive grains and wherein said segments comprise at least two circumferentially spaced regions and wherein said superabrasive grains are alternately dispersed in said regions in high and low concentrations of superabrasive grains.

The present invention is further related to an abrasive tool comprising a core and abrasive segments attached to said core wherein said abrasive segments comprise a bond material and superabrasive grains, wherein said abrasive segments comprise at least two circumferentially spaced regions and wherein said superabrasive grains are alternately dispersed in every other region.

DETAILED DESCRIPTION OF THE INVENTION

The present invention is related to an abrasive tool comprising a core and abrasive segments attached to said core wherein said abrasive segments comprise a bond material and superabrasive grains and wherein said abrasive segments comprise at least two circumferentially spaced regions wherein said superabrasive grains are either alternatively dispersed in every other region or alternatively dispersed in the regions in high and low concentrations of superabrasive grains.

Figure 1:
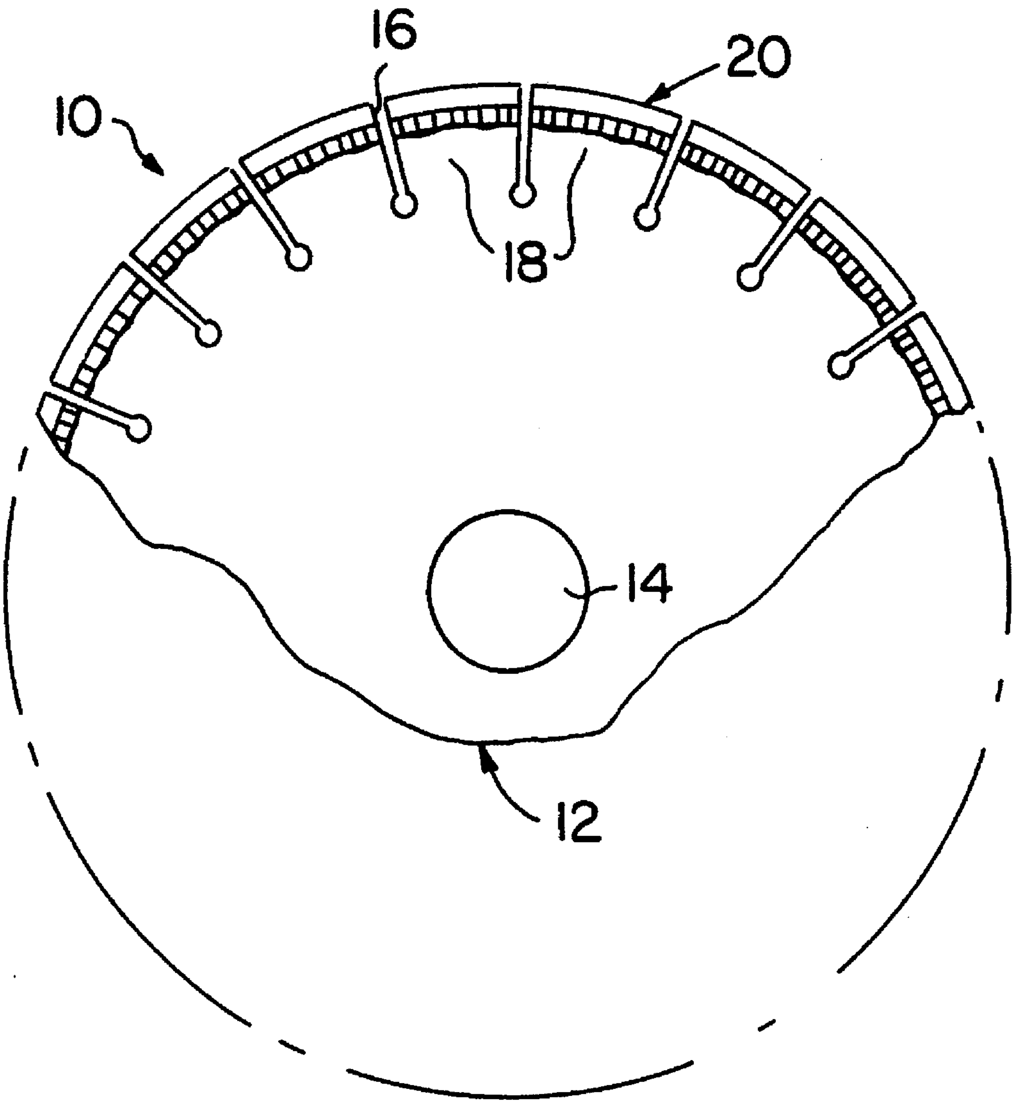
FIG. 1 is a fragmentary side view of a segmental abrasive saw blade constructed with segments of the present invention.

The core of the abrasive tool can be preformed from a resin, a ceramic or a metal. To the core is attached abrasive segments which comprise a bond material and superabrasive grains. The abrasive tool can be for example a core bit or a cutting saw. FIG. 1, the preferred embodiment of the present invention, is a rotary abrasive wheel or saw blade 10. The abrasive wheel 10 has a preformed metal support, center or disc 12 including a wall of predetermined diameter and wall thickness usually made from steel. The steel center 12 has a central hole 14 adapted for receiving a drive means or shaft of a machine on which it will be mounted and rotatably driven. Extending radially inwardly from the outer peripheral surface of the support center 12 are a plurality of radial slots 16 and intervening abrasive segment support sections 18 of the wall including abrasive segments 20 thereon angularly spaced about the axis of the center. The segments may be backed with a non-cutting metal portion 28 as shown in FIG. 2 with an inner mating surface.

Each abrasive segment support section 18 has an outer peripheral surface initially adapted for locating a mating engagement with an inner surface of the preformed abrasive segment 20 during laser beam fusion welding, electron beam fusion welding or brazing thereof to the support section 18 of the metal support wall.

Figure 2:
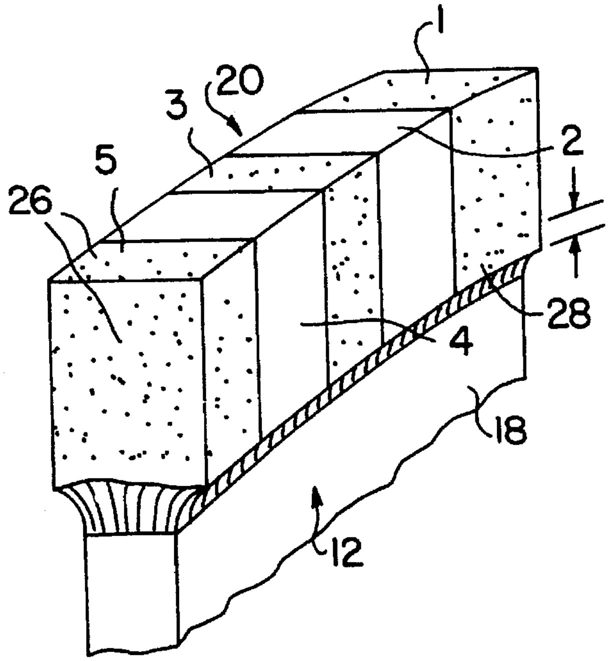
FIG. 2 is a perspective view of an abrasive segment of the present invention with circumferentially spaced regions wherein the superabrasive grains are alternately dispersed in every other region.
Figure 3:
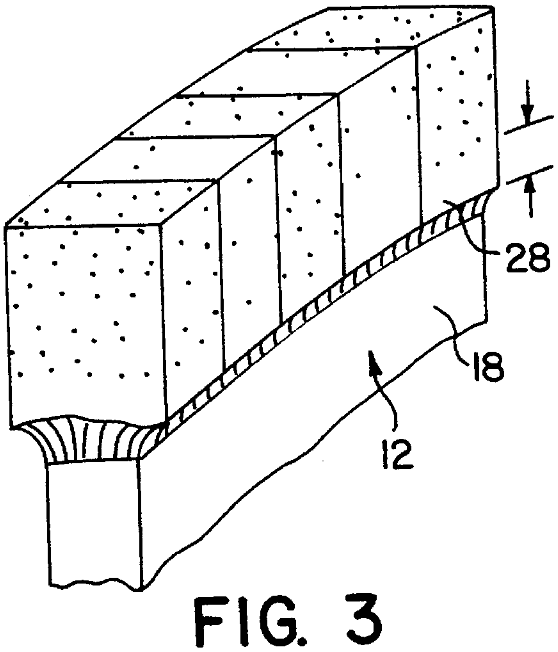
FIG. 3 is a perspective view of an abrasive segment of another embodiment of the present invention with circumferentially spaced regions and wherein said superabrasive grains are alternately dispersed in said regions in high and low concentrations of superabrasive grains.

The abrasive segments 20 may comprise at least two circumferentially spaced regions wherein the superabrasive grains are alternately dispersed in every other region, see FIG. 2, or may comprise at least two circumferentially spaced regions wherein the superabrasive grains are alternately dispersed in the regions in high and low concentrations of superabrasive grains, see FIG. 3. The preferred embodiment is where the abrasive grains are alternately dispersed in every other region, and is shown in FIG. 2.

As can be seen in FIG. 2, the abrasive segment 20 is divided into regions with abrasive grains alternately dispersed in every other region. The regions containing abrasive grain are labeled as 1, 3 and 5 in this example and alternate with regions containing only bond which are labeled as 2 and 4. Preferably, there are from about 3 to about 25 regions per abrasive segment and more preferably from about 7 to about 15 regions.

While in the preferred embodiment, the individual regions across an abrasive segment such as for example regions 1, 2, 3, 4 and 5 shown in FIG. 2 are of the same dimensions, for purposes of the present invention it is not necessary that these regions be of equivalent size. Depending on the application and end use these regions can be varied to improve properties of the abrasive wheel in a particular application. It is, however, preferable that the region on the leading edge of the segment contain abrasive grain.

This structure for a segment allows for a higher speed of cut and longer tool life at the same time. Because the regions with less or no abrasive tend to be softer, this portion of the segment tends to wear more quickly exposing those regions containing the higher diamond concentrations of the abrasive segment. An abrasive segment with a lower contact area will tend to cut faster, and the regions with high concentration of diamond will experience less wear due to the higher concentration.

Another variation of this invention is shown in FIG. 3, where the concentration of superabrasive grains varies continuously between regions or discontinuously with a sudden drop in concentration between regions. If the concentrations of superabrasive grains vary continuously between regions of the abrasive segment then the boundaries of the regions with high and low concentrations can be determined by the following method. First, the minimum and maximum concentrations of abrasive grains are measured across the abrasive segment. This is done by measuring the percentage of area across a segment continuously by measuring the concentration over 1 mm intervals, and the centerpoint of the minimum and maximum intervals are established. An artificial boundary is created by dissecting the area between centerpoints of the adjacent minimums and maximums in the superabrasive concentration.

Each region is defined as the volume between adjacent artificial boundaries and is called for purposes of this specification a defined region. While the concentration of diamond in the abrasive segment is × volume percent (which is calculated by dividing the volume of superabrasive grain in the abrasive segment by the volume of the overall abrasive segment), regions of high and low concentrations are defined as follows. High concentration regions are those regions as defined above where the concentration of superabrasive grain is greater than 2×volume percent of the overall defined region, preferably greater than 4×volume percent and more preferably greater than 8×volume percent. Low concentration regions are those regions as defined above where the concentration of superabrasive grain is less than 0.5×volume percent of the overall defined region, preferably less than 0.25×volume percent and more preferably less than 0.12×volume percent.

If the concentrations of superabrasive grains vary substantially discontinuously or discretely between regions of the abrasive segment then the boundaries of regions are defined as this discontinuous or discrete drop in concentration. A discontinuous or discrete drop in concentration is defined in an abrasive segment with an overall concentration of × volume percent as a drop of 2×volume percent in concentration over a 1 mm region of the segment, and more preferably as a drop of 4×volume percent in concentration over a 1 mm region of the segment. The regions again can be measured by measuring the centerpoint of this discontinuous or discrete drop in concentration across the abrasive segment and considering this centerpoint to be the boundary of the adjacent regions.

In the preferred embodiment, the bond in the segment is a metal bond 26. These metal bonds 26 and non-cutting metal portion 28 comprise for example materials such as cobalt, iron, bronze, nickel alloy, tungsten carbide, chromium boride and mixtures thereof. The bond can also be a glass or a resin for bonding with resin or vitrified cores.

The segments preferably contain from about 1.0 to about 25 volume percent of superabrasive grain and more preferably from about 3.5 to about 11.25 volume percent.

The average particle size of the superabrasive grain is preferably from about 100 to about 1200 um, more preferably from about 250 to about 900 um, and most preferably from about 300 to about 650 um.

Secondary abrasives can be added to the segments. These include for example tungsten carbide, alumina, sol-gel alumina, silicon carbide and silicon nitride. These abrasives can be added to the regions with higher concentrations of superabrasives or to regions with lower concentrations of superabrasives.

The preferred abrasive segments are preferably produced by molding and firing. The abrasive segments are molded in a two step process. In the first step, a mold with a cavity containing recesses for the regions of the segment containing higher concentrations of superabrasive and a recess for the non-cutting metal portion 28 is filled. First, the recesses for the regions containing higher concentrations of superabrasive are filled with a mixture comprising metal bond powder and superabrasive grains then when these recesses are completely filled metal powder containing no abrasive is used to fill the recess for the non-cutting metal portion. The mold is then fired at a temperature below the melting point of the metals used so as to sinter the mixture in the mold.

The sintered body is then removed from the mold and placed in another mold with a cavity in the shape of the segment. This creates recesses between the regions containing the higher concentrations of superabrasive grain. These recesses are then filled with loose powder containing a lower concentration of, or no superabrasive grain. The mold is then fired under pressure at a time, temperature and pressure to achieve greater than 85% theoretical density, and preferably greater than 95% theoretical density. These segments may also be produced by tape casting, injection molding and other techniques know to those skilled in the art.

In order that persons skilled in the art may better understand the practice of the present invention, the following examples are provided by way of illustration, and not by way of limitation. Additional information which may be useful in state-of-the-art practice may be found in each of the references and patents cited herein, which are hereby incorporated by reference.

EXAMPLES

Example 1

Two blades with were tested for speed of cut and wear. Both blades had abrasive segments containing 4 volume percent syntectic metal bond diamond (grade SDA100+). The blades were 16 inches in diameter and had a cutting path (kerf) of 0.150 inches.

The segments of the control blade used a bronze bond. The diamond abrasive used in both blades was 30/40 grit diamond (429–650 um). The diamond abrasive was randomly dispersed in the segments used for the control blade. The blade made with segments of the present invention contained 6 diamond containing regions alternately separated by 5 regions containing no abrasive. The matrix in the diamond containing regions was an alloy containing approximately 45% by weight iron and 55% by weight bronze. The matrix in the regions containing substantially no abrasive was bronze bond. The diamond abrasive was dispersed in the 6 diamond containing regions in a iron-bronze alloy matrix.

The blades were tested on a slab of granite aggregate cured concrete reinforced with ½" rebar. The blades were tested at a constant cutting rate of 3 inch-feet/minute, and used to cut 400 inch-feet of the concrete. The cutting rate was adjusted to be the maximum cutting rate of the control blade. This was done by adjusting the cutting rate of the control blade just to the point where the motor would stall (the circuit being set to trip at 10 kW). The blade of the present invention was run at 3 inch-feet/minute even though a higher cutting rate could have been used.

The measurements showed that the control blade wore 0.0134" while the blade with the abrasive segments of the present invention wore only 0.0036". This test showed an improvement of over 350% in the life of the blade over conventional blades at the highest speed of cut for the conventional blade.

Example 2

Another method of blade comparison involves cutting concrete without coolant at constant feed rates. The test used involves determining the number of cuts to failure. In this example, blades of the present invention were compared with control blades.

All three blades were 9 inches in diameter with a cutting path (kerf) of 0.095 inches. The segments of all blades contained 3.5 volume percent diamond. The diamond abrasive used in all blades was 30/40 grit diamond (429–650 um). The segments of the control blade known as standard #1 used a bond containing 100% cobalt. The segments of the control blade known as standard #2 used a bond containing 60% by weight iron, 25% by weight bronze and 15% by weight cobalt. The diamond abrasive was randomly dispersed in the segments used for the control blade. The blade made with segments of the present invention contained 5 diamond containing regions alternately separated by 4 regions containing no abrasive. The matrix in the diamond regions was an alloy containing approximately 45% by weight iron and 55% by weight bronze. The matrix in the regions containing substantially no abrasive was bronze bond. The diamond abrasive was dispersed in the 6 diamond containing regions in a iron-bronze alloy matrix.

The blades were run on a 5 horsepower gantry saw model no. 541C, manufactured by Sawing Systems of Knoxville, Tenn. The blades were run at approximately 5800 rpm. The substrates to be cut by the blades was 12"×12"×2" exposed aggregate stepping stones which contained ¼" to ½" river gravel in 3500 psi cement. This media is considered to be hard to very hard.

The number of cuts to failure indicates the number of passes the blade made before the circuit breaker tripped. For the test, the circuit breaker was set at 2.0 kW. Each pass of the saw cut three blocks at an one (1) inch depth of cut at a constant feed rate of 2.9 feet/minute. Higher power requirements indicate that the blade is not cutting as efficiently. As shown in Table I, the blades of the present invention never failed, but rather the test was terminated at approximately twice the number of cuts of the best performing standard blade.

| Blade | Wear Performance ($m^2$/mm wear) | Cuts to Failure (#) | Peak Power (kW) |
|---|---|---|---|
| New Blade | 1.53 | 53+ | 0.60 |
| Standard #1 | 0.7 | 17 | 2.00 |
| Standard #2 | 0.49 | 27 | 2.00 |

Example 3

In a field test of cutting concrete walls with wall saw blades, the new abrasive segment was compared to a standard blade know as the Cushion Cut WS40 made by Cushion Cut of Hawthorne, Calif. Both blades were 24 inches in diameter with a cutting path (kerf) of 0.187 inches, and were tested on a 20 horsepower hydraulic wall saw.

The segments of the control blade used an alloy of 50% iron and 50% bronze bond. The volume fraction of diamond was 5.00%. The diamond abrasive used was 30/40 grit diamond (429–650 um). The diamond abrasive was randomly dispersed in the segments used for the control blade. The blade made with segments of the present invention contained 6 diamond containing regions alternately separated by 5 regions containing no abrasive. The matrix in the diamond containing regions was an alloy containing approximately 45% by weight iron and 55% by weight bronze. The matrix in the regions containing substantially no abrasive was a bronze bond. The volume fraction of diamond was 4.00%. The diamond abrasive used was 30/40 grit diamond (429–650 um). The diamond abrasive was dispersed in the 6 diamond containing regions in a iron-bronze alloy matrix.

The results showed that the saw blade containing the abrasive segments of the present invention had a cutting rate of 5.23 inch-feet/minute (based on total cutting time) with a wear performance of 3.22 inch-feet/mil wear. While the control blade with a comparable diamond content had a cutting rate of 3.30 inch-feet/minute (based on total cutting time) with a wear performance of 18.2 inch-feet/mil wear.

Example 4

In another field test of cutting concrete walls with wall saw blades, the new abrasive segment was compared to a standard blade know as the Dimas W35 made by Dimas Industries of Princeton, Ill. Both blades were 24 inches in diameter with a cutting path (kerf) of 0.220 inches, and were tested on a 36 horsepower hydraulic wall saw.

The segments of the control blade used a cobalt bronze bond. The volume fraction of diamond in the segment was 4.875%. The diamond abrasive used was 40/50 grit diamond (302–455 um). The diamond abrasive was randomly dispersed in the segments used for the control blade. The blade made with segments of the present invention contained 6 diamond containing regions alternately separated by 5 regions containing no abrasive. The matrix in the diamond containing regions was an alloy containing approximately 45% by weight iron and 55% by weight bronze. The matrix in the regions containing substantially no abrasive was a copper bond. The volume fraction of diamond in the segment was 4.00% which was dispersed in the diamond containing regions. The diamond abrasive used was 30/40 grit diamond (329–650 um). The diamond abrasive was dispersed in the 6 diamond containing regions in a iron-bronze alloy matrix.

The blades were tested on a fifteen inch thick cured concrete wall which was being cut for demolition. The wall was made of approximately 6000 psi concrete with medium to soft aggregate. The concrete was reinforced with two layers of ½ inch rebar on twelve inch centers both horizontally and vertically. A 36 horsepower hydraulic saw was used to cut the wall.

The results showed that the saw blade containing the abrasive segments of the present invention had a cutting rate of 2.44 inch-feet/minute (based on total cutting time) with a wear performance of 57.8 inch-feet/mil wear. While the control blade with a comparable diamond content had a cutting rate of 1.82 inch-feet/minute (based on total cutting time) with a wear performance of 24.6 inch-feet/mil wear.

It is to be understood that various other modifications will be apparent to and can be readily made by those skilled in the art without departing from the scope and spirit of this invention. Accordingly, it is not intended that the scope of the claims appended hereto be limited to the description and examples set forth above but rather that the claims be construed as encompassing all of the features of patentable novelty which reside in the present invention, including all those features which would be treated as equivalents thereof by those skilled in the art to which the invention pertains.

What is claimed is:

1. An abrasive tool comprising a core having a plurality of peripheral surface sections defined by radial slots in the core; and a plurality of abrasive segments attached to the peripheral surface sections, each abrasive segment comprising abrasive grain and a bond material; and each abrasive segment having a leading edge and a long aspect, and having at least one set of parallel, alternating, first and second regions arranged transverse to the long aspect of the abrasive segment; wherein the volume percentage of abrasive grain at a center line of the first region is at least two times the volume percentage of abrasive grain at a center line of the second region.

2. The abrasive tool in claim 1, wherein the abrasive segments contain a metal bond.

3. The abrasive tool in claim 2, wherein the abrasive segments further include a secondary abrasive.

4. The abrasive tool in claim 1, wherein the core is metal.

5. The abrasive tool in claim 1, wherein the abrasive tool is a cutting saw.

6. An abrasive tool comprising a core having a plurality of peripheral surface sections defined by radial slots in the core; and a plurality of abrasive segments attached to the peripheral surface sections, each abrasive segment comprising abrasive grain and a bond material; and each abrasive segment having a leading edge and a long segment and having at least one set of parallel, alternating, first and second regions arranged transverse to the long aspect of the abrasive segment; wherein substantially all abrasive grain is contained in the first regions, the second regions are substantially free of abrasive grain, and a first region is located at the leading edge of each abrasive segment.

7. The abrasive tool in claim 1, wherein the abrasive segments contain a metal bond.

8. The abrasive tool in claim 2, wherein the abrasive segments further include a secondary abrasive.

9. The abrasive tool in claim 1, wherein the core is metal.

10. The abrasive tool in claim 1, wherein the abrasive tool is a cutting saw.

11. The abrasive tool of claim 1, wherein a first region is located at the leading edge of each abrasive segment.

12. The abrasive tool of claim 1, wherein the abrasive tool is a core bit.

13. The abrasive tool of claim 6, wherein the abrasive tool is a core bit.

* * * * *